United States Patent
Myers

(10) Patent No.: US 10,823,524 B2
(45) Date of Patent: Nov. 3, 2020

(54) SYSTEMS AND METHODS FOR REALISTIC PRACTICE FIRING OF A FIREARM

(71) Applicant: Eureka Software Solutions Inc., Austin, TX (US)

(72) Inventor: Monty Goetz Myers, Austin, TX (US)

(*) Notice: Subject to any disclaimer, the term of this patent is extended or adjusted under 35 U.S.C. 154(b) by 282 days.

(21) Appl. No.: 15/372,590

(22) Filed: Dec. 8, 2016

(65) Prior Publication Data

US 2017/0167819 A1     Jun. 15, 2017

Related U.S. Application Data

(60) Provisional application No. 62/265,060, filed on Dec. 9, 2015.

(51) Int. Cl.
   *F41A 33/00*   (2006.01)
   *G09B 9/00*    (2006.01)

(52) U.S. Cl.
   CPC .............. *F41A 33/00* (2013.01); *G09B 9/00* (2013.01)

(58) Field of Classification Search
   CPC .......... F41A 33/00; F41A 33/06; F41A 21/10; F41A 21/26; G09B 9/00; G09B 9/003; F41G 3/26
   See application file for complete search history.

(56) References Cited

U.S. PATENT DOCUMENTS

| | | | | |
|---|---|---|---|---|
| 1,517,328 A | * | 12/1924 | Weiss | F41A 21/10 42/77 |
| 3,510,965 A | * | 5/1970 | Rhea | F41A 33/02 434/21 |
| 4,123,866 A | * | 11/1978 | Wiethoff | F41A 21/10 42/51 |
| 5,048,211 A | * | 9/1991 | Hepp | F41A 17/44 42/70.11 |
| 6,869,285 B1 | * | 3/2005 | Jones, II | G09B 19/00 42/10 |
| 8,602,784 B2 | * | 12/2013 | Dvorak | F41A 33/02 434/18 |
| 2015/0226516 A1 | * | 8/2015 | Dvorak | F41B 11/723 124/73 |

* cited by examiner

*Primary Examiner* — Eugene L Kim
*Assistant Examiner* — Alyssa M Hylinski
(74) *Attorney, Agent, or Firm* — Pierson IP, PLLC

(57) ABSTRACT

Embodiments disclosed herein describe systems and methods for simulating realistically practicing firing of a firearm. More particularly, embodiments disclose coupling a moving cylinder with a thrust rod into the barrel of a firearm, wherein responsive to a user pressing the trigger, the thrust rod moves a slide of the firearm.

8 Claims, 5 Drawing Sheets

SYSTEMS AND METHODS FOR REALISTIC PRACTICE FIRING OF A FIREARM

CROSS-REFERENCE TO RELATED APPLICATIONS

This application claims a benefit of priority under 35 U.S.C. § 119 to Provisional Application No. 62/265,060 filed on Dec. 9, 2015, which is fully incorporated herein by reference in its entirety.

BACKGROUND INFORMATION

Field of the Disclosure

Examples of the present disclosure are related to systems and methods for simulating a realistic practice firing of a firearm. More particularly, embodiments disclose positioning a moving cylinder with a thrust rod within the barrel of the firearm, a barrel hammer, or both, wherein responsive to a user pressing the trigger the thrust rod is configured to move the slide of the firearm.

BACKGROUND

Safety and competency are always of the utmost importance when handling and using firearms. When handling a firearm, it is desirable to simulate scenarios that are realistic as possible. These simulations allow the user of a firearm to safely and repeatedly practice and use the firearm without ammunition.

Unfortunately, when using unloaded firearms during simulations, the effectiveness of the simulations are drastically reduced because actual cartridges are not used during the simulations. When actual cartridges are not used during the simulations, firing of the firearm does not cycle normally to immediately reset a trigger of the firearm for a next shot. Because each firearm has a trigger with unique characteristics such as slack, pressure, travel distance, and reset, it is essential that a user learns the unique characters of the trigger of the firearm.

However, for the reasons of safety, economy, etc., during these simulations live ammunition is not used. During the simulations, the sounds, recoil effects, and other aspects of the actual weapon may be implemented with simulated weapons. However, conventional simulated weapons cannot replicate the unique characteristics of an individual firearm.

Accordingly, needs exist for more effective and efficient systems and methods to simulate using a firearm.

SUMMARY

Embodiments disclosed herein describe systems and methods for simulating the realistic practicing firing of a firearm. More particularly, embodiments disclose positioning a moving cylinder with a thrust rod within the barrel of a firearm, wherein responsive to a user pressing the trigger, the thrust rod is configured to move a slide or bolt (referred hereinafter as "slide") of the firearm.

In embodiments, a moving cylinder may be positioned inside a barrel of the firearm through a muzzle end of the firearm. The moving cylinder may be removably positioned within the barrel of the firearm via a breach nut positioned within the barrel of the firearm, and a barrel nut positioned adjacent to the end of the barrel of the firearm. Accordingly, the breach nut, barrel nut, and the moving cylinder are configured fill the breech and barrel of the firearm, rending the firearm safe and unloadable.

In embodiments, the breach nut may be shaped and sized similar to an actual cartridge for the caliber of the firearm being operated.

In embodiments, the moving cylinder may be configured to extent through the barrel nut, the barrel of the firearm, and the breach nut. The moving cylinder may include a thrust rod that is configured to be positioned adjacent a slide of the firearm, in a manner that is similar to the actual positioning of a conventional firearm cartridge. Responsive to a trigger of the firearm being triggered, a firing pin applies pressure to the thrust rod towards a breach of the firearm. When the firing pin contacts the thrust rod, the moving cylinder may be configured to cause the thrust rod to extend and apply pressure against a rear of the slide. This pressure may move the slide back in place, which may be similar to a detonating a conventional firearm cartridge.

In embodiments, when the thrust rod reaches a maximum stroke distance, the moving cylinder may no longer apply pressure to the thrust rod. This may cause the thrust rod to be in a non-extended position, which may allow a firearm recoil spring to return the slide back to a closed position. When the thrust rod is in its non-extended position, the user of the firearm may immediately repress the trigger, which may once again cause the thrust rod to become extended to move the slide back in place.

In embodiments, the thrust rod may be moved via compressed air or $CO_2$ (referred to hereinafter collectively and individually as "compressed air") cartridge that is positioned on a portion of the moving cylinder that extends away from the barrel. Responsive to the trigger of the firearm being pressed, the compressed air may be opened to move the thrust rod against the rear of the slide. When the thrust rod is in the extended position, the compressed air may be closed to allow the pistol recoil spring to return the slide to the closed position.

In embodiments, when a compressed air valve opens, a burst of air may be directionally ported downward and forward from the end of the moving cylinder to move the thrust rod simulating a muzzle flip that may occur when actually firing a live round from the firearm.

In further embodiments, a trigger laser may be coupled to an end of the moving cylinder. The triggering of the laser may coincide with the triggering mechanism of the firearm, which may incorporate a practice target system that includes hits and/or misses of laser shots.

Embodiments may be configured to be installed in firearms, such as a 9 mm, 38 auto, 40S&W, 45ACP, etc. Embodiments may be configured to be installed in a user's own firearm with no disassembly required and no model specific parts to install on the firearm. Accordingly, a user may develop the accurate muscle memory to operate their firearms safely and effectively.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
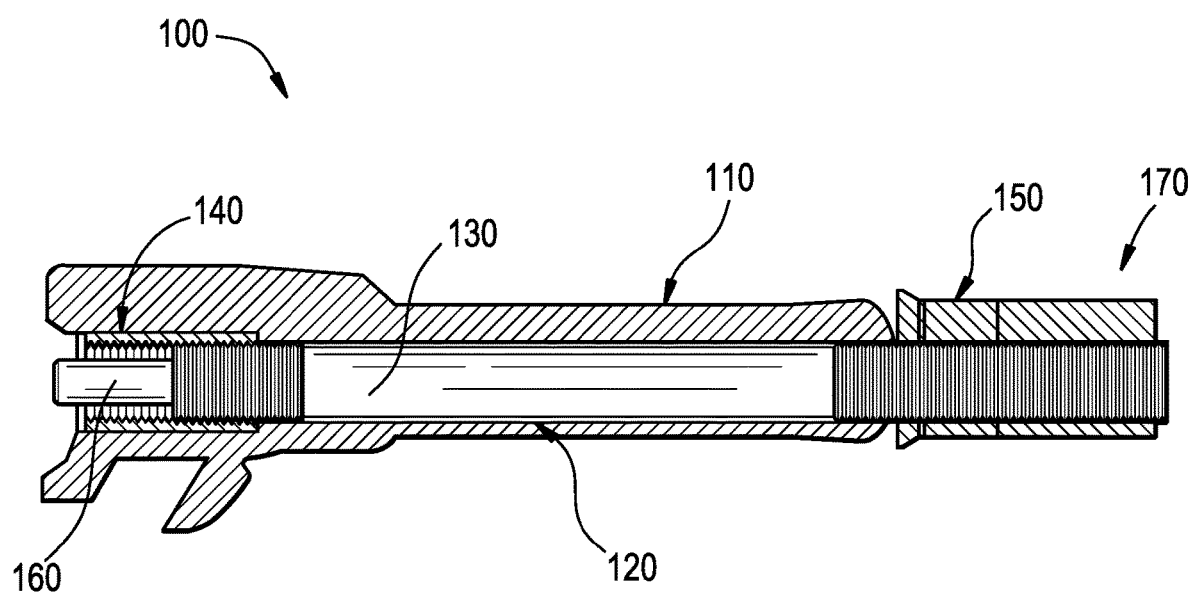
FIG. 1 depicts a system to simulate realistically practicing firing of a firearm, according to an embodiment

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods for simulating realistically practicing firing of a firearm. More particularly, embodiments disclose coupling a moving cylinder with a thrust rod into the barrel of a firearm, wherein responsive to a user pressing the trigger, the thrust rod moves a slide of the firearm and/or a hammer strikes the barrel.

FIG. 1 depicts a system 100 to simulate realistically practicing firing of a firearm, according to an embodiment. System 100 may include a firearm 110, barrel 120, moving cylinder 130, breach nut 140, barrel nut and washer 150, thrust rod 160, and reloading mechanism (not shown).

Firearm 110 may be a portable gun that is configured to launch one or more projectiles through barrel 120 by the action of explosive force. Firearm 110 may be a semi-automatic or self-loading firearm that is configured to perform all the steps necessary to prepare firearm 110 to discharge again after firing when cartridges remain in the feed device of firearm 110. Firearm 110 may include a slide that is configured to move during the operating cycle of firearm 100, which may be utilized to chamber a cartridge. The slide may house a firing pin or striker. The slide may be spring-loaded so that once the slide has moved to its rearmost position in the firing cycle, the spring tension of the spring may bring the slide back to the starting position. Responsive to the slide being brought back to the starting position, the slide may simulate a new cartridge being chambered. When the trigger of firearm 110 is pressed, system 100 may simulate ejecting a spent casing, cocking the hammer or striker for the next shot, and loading another cartridge into the chamber of firearm 110. To this end, system 100 may simulate the ejecting and chambering of a cartridge without the use of live ammunition.

Barrel 120 may be a hollow tube through which a projectile may propel through. A first end of the barrel may include a chamber. The chamber may be configured to house a cartridge, prior to being fired, and/or breach nut 140. A second end of the barrel may include an opening where the projectile may propel from. In embodiments, the hollow tube associated with barrel 120 may extend from the first end to the second end.

Moving cylinder 130 may be a mechanical device which is configured to produce a force in a reciprocating linear motion via reloading mechanism 170. Moving cylinder 130 may have a length that is at least as long as barrel 120, wherein moving cylinder 130 is configured to be inserted into barrel 120. A first end of moving cylinder 130, including thrust rod 160, may be configured to couple with breach nut 140 positioned at the first end of barrel 120. A second end of moving cylinder 130 may be configured to couple with barrel nut and washer 150 at the second end of barrel 120. The first end and the second end of moving cylinder 130 may be threaded, such that breach nut 140 and barrel nut and washer 150 may be coupled to the ends of moving cylinder.

In embodiments, the first inch of the first end of moving cylinder 130 may be threaded, and the last two and a half inches of the second end of the moving cylinder may be threaded. The overall length of moving cylinder 130 may be long enough to extend beyond a muzzle end of barrel 120 when the first end of moving cylinder 130 is coupled with breach nut 140 within the chamber. For example, moving cylinder 130 may have a length of at least five inches. However, the length of moving cylinder 130 may be any desired length. Moving cylinder 130 may have a diameter that is smaller than the diameter of barrel 120, such that moving cylinder 130 may be inserted through barrel 120. For example, in embodiments, moving cylinder 130 may have a diameter that is no more than 0.346".

Breach nut 140 may be shaped and/or sized similarly to a conventional cartridge of firearm 110. Breach nut 140 may be configured to be positioned within the chamber of barrel 120, such that the sidewalls of breach nut 140 are adjacent to the inner sidewalls of the chamber of barrel 120. Breach nut 140 may have a threaded passageway that extends through the breach nut 140, from a first face of breach nut 140 to a second face of breach nut 140. Breach nut 140 may be configured to be inserted directly into the chamber of firearm 110. Responsive to being inserted into the chamber, the first end of moving cylinder 130 may be screwed into the threaded passageway. In embodiments, breach nut 140 may have a modified shape, being necked down in the rear. This may avoid common extractors on a broad range of firearms 110, which may allow for the slide to move rearward without the extractor catching on or interfering with breach nut 140.

Barrel nut and washer 150 may be configured to be positioned adjacent to the second end of the barrel 120. Barrel nut and washer 150 may have a threaded passageway that extends through barrel nut and washer 150. The second end of moving cylinder 130 may be screwed into and through the threaded passageway. In embodiments, the washer may be configured to be positioned adjacent to both the second end of barrel 120 and the barrel nut, wherein the washer may be comprised of a softer material than the barrel nut. This may avoid, reduce, eliminate, etc. scuffs on or damage to the second end of barrel 120. Furthermore, the washer may have a caliber specific wedge piece to isolate moving cylinder 130 from barrel 120 in larger caliber firearms 110. In embodiments, it may be desirable to have a wider barrel nut to allow for easy hand tightening of this nut.

Thrust rod 160 may be an extendible cylinder that is configured to be positioned on a first end of moving cylinder 130, wherein at least a portion of thrust rod 160 is positioned within the passageway through breach nut 140. Additionally, thrust rod 160 may be configured to be positioned adjacent to a slide of the firearm 110. Thrust rod 160 may be configured to extend to move the slide of firearm 110 responsive to the trigger of firearm 110 being pressed.

In embodiments, moving cylinder 130 may be screwed into breach nut 140 until thrust rod 160 is positioned against the slide. The end of the thrust rod 160 may include a material cap comprised of material that is softer than the body of the thrust rod 160. This may reduce, limit, or avoid wear at the point of contact between thrust rod 160 and the slide. In embodiments, thrust rod 160 may have a smaller diameter than the diameter of moving cylinder 130 and the diameter of the passageway through breach nut 140. Accordingly, when thrust rod 160 is extended or retracted, the circumference of thrust rod 160 may not contact the circumference of the passageway through breach nut 140. In embodiments, when thrust rod 160 is extended, an end of thrust rod 160 may be positioned up to one inch away from the first end of moving cylinder 130. When thrust rod 160 is not extended, an end of thrust rod 160 may be positioned less than one inch away from the first end of moving cylinder 130.

The reloading mechanism 170 may be comprised of compressed air and tubing configured to move thrust rod 160 along a linear path, wherein the compressed air may be configured to apply force to extend thrust rod 160. Reloading mechanism 170 may be coupled to an end moving cylinder 130 or be positioned on firearm 110. For example, the reloading mechanism 170 may include a quick attach fitting configured to be positioned proximate to the second of barrel 120. The reloading mechanism 170 may be configured to apply force to thrust road responsive to determining that the trigger of firearm is pressed and/or to a firing pin of firearm 110 contacting thrust rod 160. Responsive to determining the firearm is pressed or the firing pin contacted thrust rod 160, the reloading mechanism 170 may be set to apply force between 125 psi and 250 psi to thrust rod 160. This force may be configured to extend thrust rod 160 along a linear path, which may simulate a casing of a cartridge exiting the chamber. The reloading mechanism 170 may also include a swiveling fitting to help ensure that an air supply hose is not aligned with the sights of firearm 110.

In embodiments, the reloading mechanism 170 may be coupled with moving cylinder via a lightweight and flexible pneumatic hose. In additional embodiments, an optional clip may be utilized to relieve the weight of the hose from the second end of firearm 110. One skilled in the art may appreciate that the reloading mechanism 170 may be any mechanical and/or electrical device that is configured to determine the trigger of the firearm is pressed or the firing pin is in contact with thrust rod 160, and utilize the force and dislocation of the firing pin on the center of thrust rod 160 to mechanically initiate a pneumatic valve, such as thrust rod 160, at the second end of moving cylinder 130. The force applied by the firing pin against the thrust rod 160 may be around 5 pounds, and the linear dislocation of the firing pin may be around 0.11 to 0.12 inches.

Responsive to a trigger of the firearm 110 being triggered, the firing pin may contact thrust rod 160 applying pressure to thrust rod 160. When the firing pin contacts thrust rod 160 and/or the trigger is pressed, moving cylinder 130 may be configured to cause the thrust rod to extend via the compressed air within the reloading mechanism 170. When thrust rod 160 extends, a second end of thrust rod 160 may apply pressure against the slide. This pressure may move the slide back rearward, which may be similar to a detonating cartridge.

In embodiments, when thrust rod 160 reaches a maximum stroke distance, moving cylinder 130 may automatically no longer apply pressure to thrust rod 160. When moving cylinder 130 does not apply pressure to thrust rod 160, thrust rod 160 may be automatically retracted via a force of a firearm recoil spring being greater than the force of thrust rod 160 without the force being supplied by the compressed air. This may allow the firearm recoil spring to return the slide back to a closed position. When thrust rod 160 is in the retracted or non-extended position, the user of firearm 110 may immediately repress the trigger, which may once again cause thrust rod 160 to become extended, via moving cylinder 130 and the compressed air, to move the slide back in place to an open position.

Accordingly, the force and dislocation of the firing pin may be applied to the first end of moving cylinder 130 via thrust rod 160. The force and dislocation of the firing pin may open an air input valve on the reloading mechanism 170, which cause thrust rod 160 to become extended. The extension of thrust rod 160 may cause the slide to shift rearwardly. An internal mechanical mechanism within moving cylinder 130 may be configured to unlatch when pistons associated with the moving cylinder 130 have fully extended thrust rod 160. These internal mechanisms may automatically shut off the compressed air supply based on the full extension of thrust rod 160 and allow the slide to return immediately to a closed position. This may reset the firearm's triggering mechanism for a next cycle.

Figure 2:
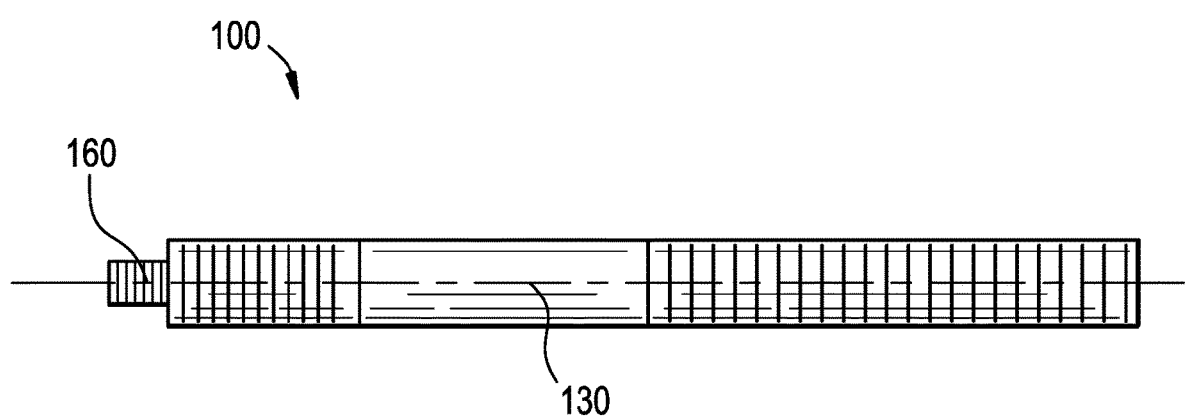
FIG. 2 depicts a moving cylinder, according to an embodiment.

FIG. 2 depicts a moving cylinder 130, according to an embodiment. Certain elements depicted in FIG. 2 are described above. Therefore, for the sake of brevity, a further description of these elements is omitted.

As depicted in FIG. 2, thrust rod 160 may be positioned on a first end of moving cylinder 130, wherein pistons, cylinders, mechanical components and/or electrical components are configured to extend an end of thrust rod 160 away from the first end of moving cylinder 130. In embodiments, when extended a face of thrust rod 160 may be configured to be extended up to one inch away from the first end of moving cylinder 130. When thrust rod 160 is not extended, the face of thrust rod 160 may be positioned a quarter inch away from the first end of moving cylinder. Responsive to a slide of a firearm applying force against thrust rod 160, thrust rod 160 may move to no longer be extended. This may cause the face of thrust rod 160 to be more proximate to the first end of moving cylinder 130 then when thrust rod 160 is extended. In embodiments, thrust rod 160 may be threaded and have a smaller diameter than moving cylinder.

The first end of moving cylinder 130 and the second end of moving cylinder 130 may be threaded, wherein a center portion of moving cylinder 130 may not be threaded. In embodiments, the threads on the second end of moving cylinder 130 may have a longer length and extend to a position more proximate to the center of moving cylinder than the threads on the first end of moving cylinder 130.

Figure 3:
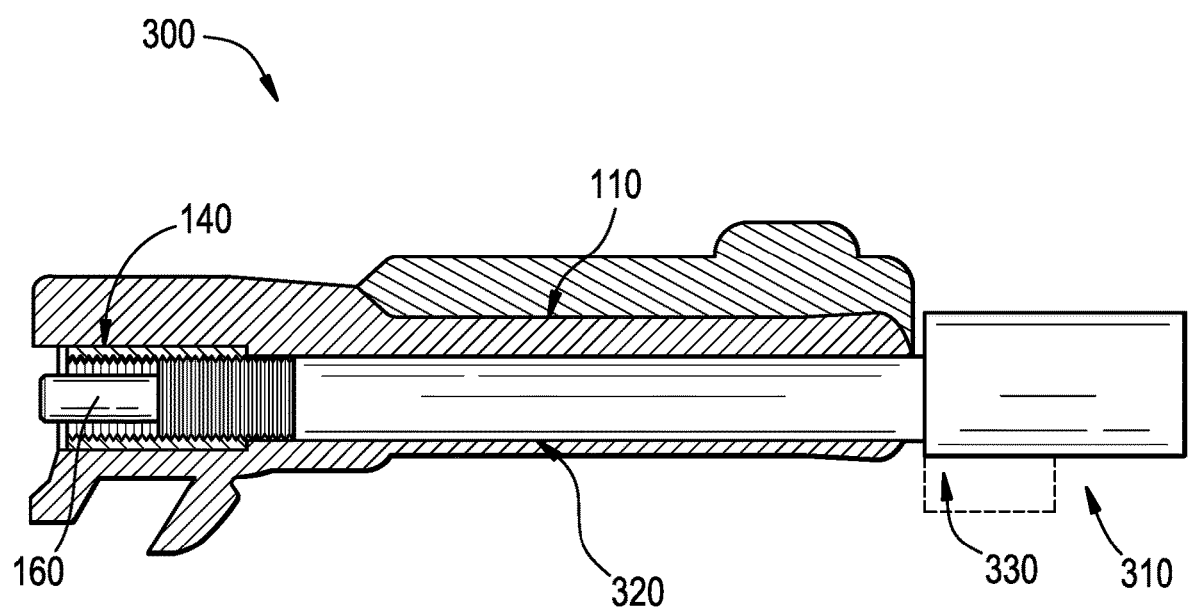
FIG. 3 depicts a system to simulate realistically practicing firing of a firearm, according to an embodiment.

FIG. 3 depicts a system 300 to simulate realistically practicing firing of a firearm, according to an embodiment. Elements that are somewhat similar to those depicted in FIG. 3 may be described above. Therefore, for the sake of brevity, a further description of these elements is omitted.

As depicted in FIG. 3, moving cylinder 310 may be positioned adjacent to the second end of firearm 110. Moving cylinder 310 may have a circumference that is small enough that it does not block the sights of firearm 110. By positioning moving cylinder 310 outside of barrel 120, embodiments may allow for a larger bore cylinder to provide more power. This may also create more space through the barrel to support the triggering mechanism of firearm 110. As further depicted in FIG. 3, moving cylinder 310 may include an in-barrel sleeve 320 that is configured to couple with moving cylinder 310 and breach nut 140, wherein in barrel sleeve 320 may have a length that is at least as long as the distance from the distal end of the chamber to the second end of barrel 120. Thrust rod 160 may be positioned on barrel sleeve 320.

In furthermore embodiments, the reloading mechanism 330 may be positioned underneath moving cylinder 310, and adjacent to portions of firearm 110.

Figure 4:
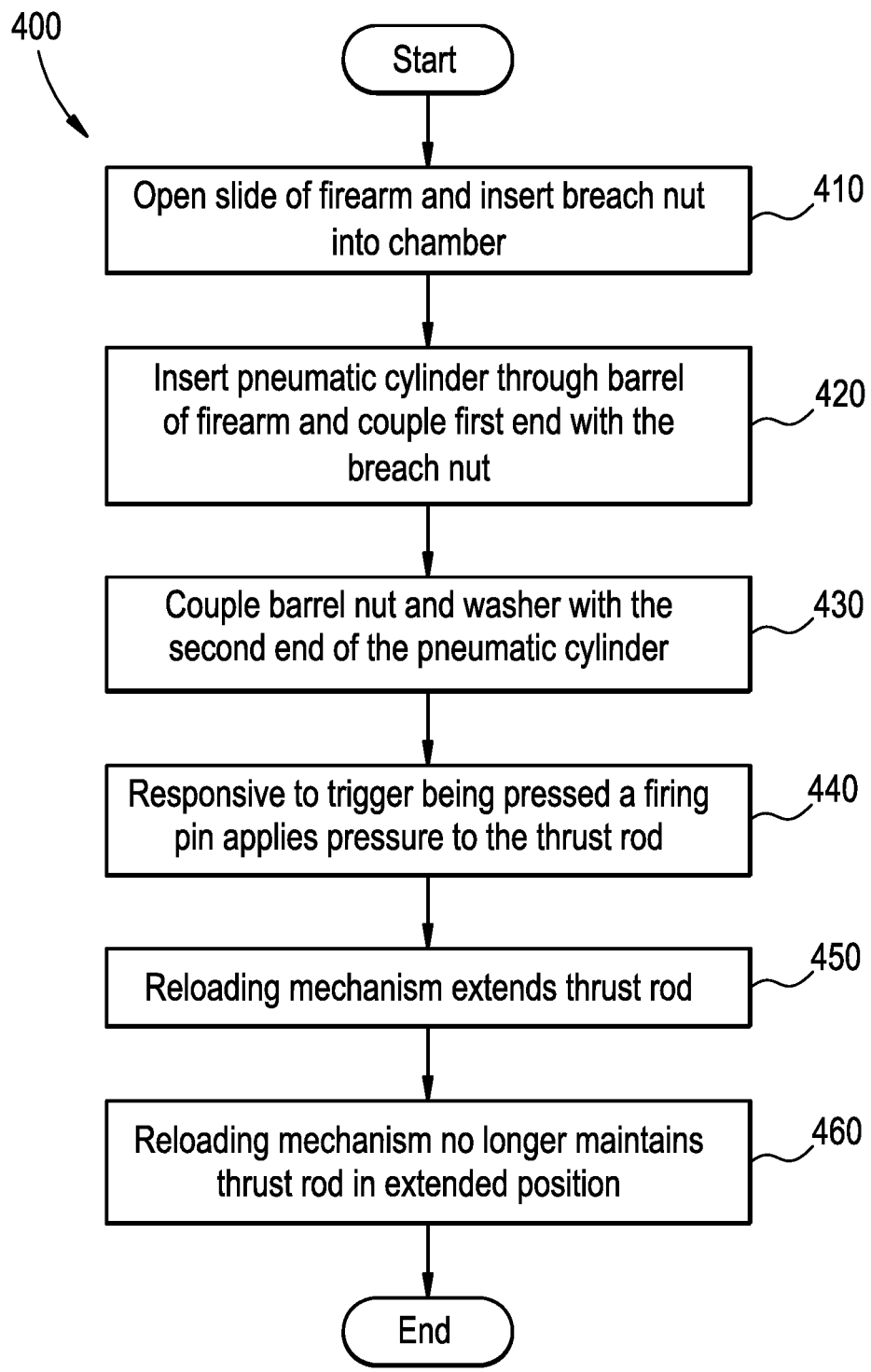
FIG. 4 depicts a method of simulating realistically practicing firing of a firearm, according to an embodiment.

FIG. 4 depicts an embodiment of a method 400 of simulating realistically practicing firing of a firearm. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

At operation 410, the slide of a firearm may be opened, and a breach nut may be inserted into the chamber of the firearm. The breach nut may be shaped and/or sized as a cartridge associated with the firearm.

At operation 420, a moving cylinder may be inserted through the barrel of the firearm, and a first end of the moving cylinder may be coupled with the breach nut. In embodiments, the moving cylinder may be coupled with the breach nut by screwing the first end of the moving cylinder through a passageway within an inner diameter of the breach nut.

At operation 430, a barrel nut and washer may be coupled with a second end of the moving cylinder. In embodiments, the moving cylinder may be coupled with the barrel nut and washer by screwing the second end of the moving cylinder through inner diameters of the barrel nut and washer. Responsive to coupling the moving cylinder with the barrel nut and washer, the washer may be positioned adjacent to the opening of barrel of the firearm, and between the barrel nut and the opening of the barrel. This may secure a body of the moving cylinder in a fixed location.

At operation 440, responsive to the trigger of the firearm being pressed, a firing pin of the firearm may apply pressure to a thrust rod positioned on the first end of the moving cylinder.

At operation 450, responsive to the trigger being pressed and/or the firing pin of the firearm applying pressure to the thrust rod, compressed air within a reloading mechanism may be configured to cause the thrust rod to extend in a linear direction, wherein the linear direction may be from the second end of the moving cylinder towards the first end of the moving cylinder. When the thrust rod extends, the thrust rod may apply pressure against the slide, which may simulate a detonating cartridge.

At operation 460, when the thrust rod is in the extended position, the reloading mechanism may no longer supply air to maintain the thrust rod in the extended position, and the thrust rod may automatically move the non-extended position. This may allow the slide to return to a closed position, which may reset the firearm's triggering mechanism for a next cycle.

Figure 5:
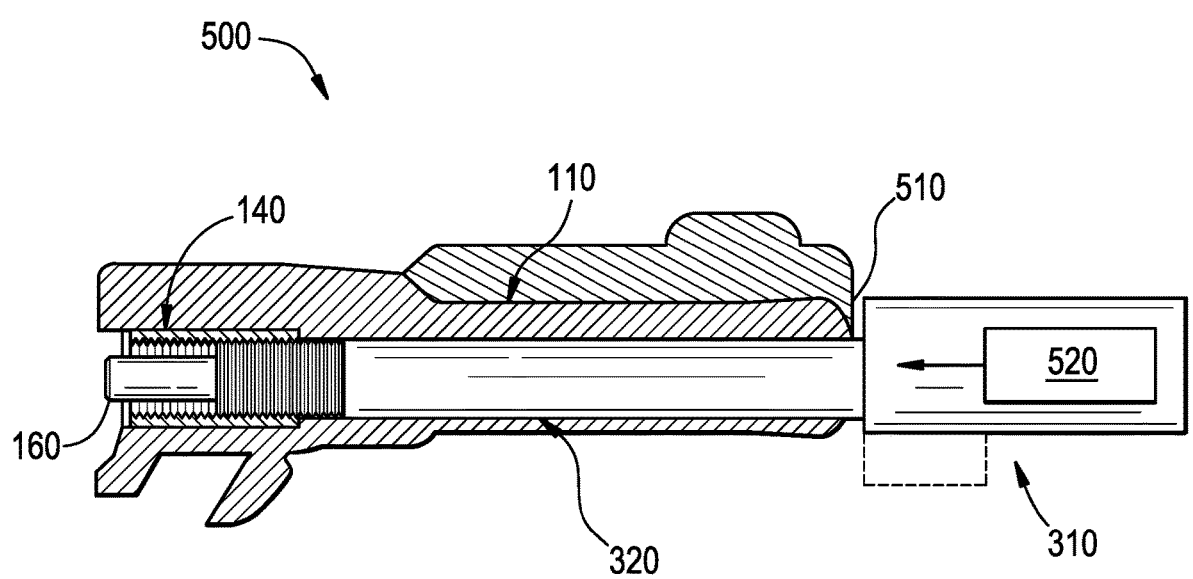
FIG. 5 depicts a system to simulate realistically practicing firing of a firearm, according to an embodiment.

FIG. 5 depicts a system 500 to simulate realistically practicing firing of a firearm 110, according to an embodiment. Elements that are somewhat similar to those depicted in FIG. 5 may be described above. Therefore, for the sake of brevity, a further description of these elements is omitted. In implementations, system 500 may operate with or without thrust rod 160. Additionally, in embodiments a front end of barrel 110 may project away and be positioned away from slide front end 510, such that the two ends do not form a planar surface.

As depicted in FIG. 5, moving cylinder 310 may have a hammer 520 positioned in front of a slide front end 510, and adjacent to the barrel of firearm 110. Furthermore, slide front end 510 and barrel 110 may be mechanically coupled such that the movement of barrel 110 may correspondingly move slide front end 510.

Hammer 520 may include compressed air, piston, or other mechanical elements that are configured to generate a force on the barrel of the firearm 110, which in turn generates a force to the slide barrel of firearm 110 and slide front end 510. The force generated by hammer 520 may be applied in a direction from the front of the firearm towards the rear of the firearm simulating a projectile leaving barrel 110. This force applied to barrel end 110 caused by the momentum of hammer 520 may be translated to the slide of firearm 510 in a similar fashion to the firing a round of ammunition, which causes the slide 510 to move rearward to reset the firearm.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

What is claimed is:

1. A system for simulating firing a firearm, the system comprising:
   a barrel of a firearm;
   a breach nut configured to be positioned within a chamber of the firearm, the breach nut including a threaded hollow passageway;
   a barrel nut configured to be positioned outside of the chamber of the firearm;

a cylinder including a first end and a second end, the first end being configured to be positioned within the barrel of the firearm, the first end of the cylinder being coupled to the breach nut via the threaded hollow passageway to fix the first end of the cylinder in place, the second end of the cylinder protruding away from a distal end of the barrel and being coupled with the barrel nut to fix the second end of the cylinder in place, the cylinder having a length that is at least as long as the barrel of the firearm to allow the second end of the cylinder to protrude away from the distal end of the barrel;

a thrust rod positioned on the first end of the cylinder being configured to extend and retract responsive to the firearm firing while the cylinder remains fixed in place, wherein the thrust rod is configured to first extend away from the first end of the cylinder to move a slide of the firearm responsive to the firearm firing and then retract within a body of the cylinder.

2. The system of claim 1, wherein a face of the thrust rod is configured to be positioned outside of the first end of the cylinder when retracted in a retracted position.

3. The system of claim 1, wherein the first end and the second end of the cylinder are threaded, wherein the threads positioned on the second end of the cylinder include a proximal end positioned within the chamber of the firearm and a distal end positioned outside of the chamber of the firearm.

4. The system of claim 1, further comprising:
a hammer being coupled with the cylinder and positioned adjacent to an opening of the barrel, the hammer being configured to apply a rearward force responsive to a trigger of the firearm being pressed.

5. A method for simulating firing a firearm, the method comprising:
positioning a breach nut within a chamber of the firearm, the breach nut including a threaded hollow passageway;
positioning a barrel nut outside of the chamber of the firearm;
positioning a cylinder within a barrel of the firearm, the cylinder including a first end and a second end;
coupling the first end of the cylinder in a first fixed position with the breach nut via the threaded hollow passageway;
coupling the second end of the cylinder in a second fixed position with the barrel nut outside of the chamber of the firearm, wherein the second end of the cylinder protrudes away from a distal end of the barrel of the firearm, the cylinder having a length that is at least as long as the barrel of the firearm to allow the second end of the cylinder to protrude away from the distal end of the barrel;
extending a thrust rod positioned on the first end of the cylinder while the cylinder remains fixed in place responsive to the firearm firing to move a slide of the firearm, wherein the thrust rod extends away from the first end of the cylinder responsive to the firearm firing;
retracting the thrust rod after extending the thrust rod.

6. The method of claim 5, wherein a face of the thrust rod is configured to be positioned outside of the first end of the cylinder when retracted.

7. The method of claim 5, wherein the first end and the second end of the cylinder are threaded, wherein the threads positioned on the second end of the cylinder include a proximal end positioned within the chamber of the firearm and a distal end positioned outside of the chamber of the firearm.

8. The method of claim 5, further comprising:
coupling a hammer with the cylinder, wherein the hammer is positioned adjacent to an opening of the barrel;
applying, via the hammer, a rearward force responsive to a trigger of the firearm being pressed.

* * * * *